United States Patent [19]

Maitani et al.

[11] 4,064,517
[45] Dec. 20, 1977

[54] PHOTOMETRIC APPARATUS FOR SINGLE LENS REFLEX CAMERA

[75] Inventors: Yoshihisa Maitani; Kunio Shimoyama; Muneaki Yoshida; Akihiko Hashimoto; Masahiro Kitagawa, all of Hachioji, Japan

[73] Assignee: Olympus Optical Co., Ltd., Tokyo, Japan

[21] Appl. No.: 717,088

[22] Filed: Aug. 24, 1976

Related U.S. Application Data

[62] Division of Ser. No. 505,956, Sept. 13, 1974, Pat. No. 3,994,001.

[30] Foreign Application Priority Data

July 2, 1974    Japan .................................. 49-75694

[51] Int. Cl.² .......................... G03B 7/08; G03B 17/20
[52] U.S. Cl. ........................................ 354/51; 354/56
[58] Field of Search .................. 354/22, 23 R, 31, 50, 354/51, 152, 288, 60 R, 56

[56] References Cited

U.S. PATENT DOCUMENTS 3,730,063   5/1973   Kobayashi et al. ..................... 354/31
3,846,805   11/1974  Kiyohara et al. ................... 354/23 R
3,855,603   12/1974  Ichihashi ........................... 354/60 X Primary Examiner—L. T. Hix
Assistant Examiner—M. L. Gellner
Attorney, Agent, or Firm—Ostrolenk, Faber, Gerb & Soffen

[57] ABSTRACT

A photometric apparatus for single lens reflex camera and of the type in which an exposure value is determined by photometry of light which is transmitted through a photographic optical system and is reflected by at least one of the surfaces of a shutter blind and a film, said apparatus comprising a photoelectric transducer element for receiving light reflected by at least one of the surfaces of a shutter blind and a film, and an operational amplifier for biasing the photoelectric transducer element to maintain the voltage applied thereacross substantially null, thereby enabling a photometric output of the photoelectric transducer element to be effectively derived even when the amount of light received is minimal. The photometric apparatus, including a photoelectric transducer element, a photometry switch and associated circuitry are mounted upon a printed circuit board mounted within the camera to position the transducer element to receive reflected light from the film or the shutter.

10 Claims, 21 Drawing Figures

PHOTOMETRIC APPARATUS FOR SINGLE LENS REFLEX CAMERA

This is a division of Application Ser. No. 505,956, filed Sept. 13, 1974, now U.S. Pat. No. 3,994,001.

BACKGROUND OF THE INVENTION

The invention relates to a photometric apparatus for single lens reflex cameras and of the type in which an exposure value is determined by photometry with a photoelectric transducer element which sense light reflected from an object being photographed which light is transmitted through a photometric optional system and is further reflected by at least one of the surfaces of a film and a shutter blind.

In a conventional single lens reflex camera, the light which is transmitted through a photographic optical system is made to be directly incident on a photoelectric transducer element which is interposed on a light path at a position nearer an object being photographed than a film. This arrangement requires the provision for storage failures a photometric result until a shutter blind is allowed to operate. As a result, an expensive memory is required in a photometric system of this type. In addition, because photometry is interrupted when the film is being exposed, there resulted an inconvenience such that when the exposure factors vary, a close adherence to such variation can not be followed. Additionally, there is a need for a change-over switch which is operated upon shutter release in order to permit a recovery of the stored photometric value from the memory, thereby adding to the complexity and the possibility in occurrence of faulures of the system.

There has been a proposal which overcomes such inconveniences by determining an exposure value by photometry with a photoelecric transducer element of light from an object being photographed which is transmitted through a photographic optical system and is reflected by at least one of the surfaces of a shutter blind and a film. However, as the light which is transmitted through the photographic optical system is weakened, the reflected light from the surface of either the shutter blind or the film will be still further reduced in intensity as a result of the diaphragm setting, presenting a difficulty in that the operation of the photoelectric transducer element becomes critical. The situation is even more aggravated by the fact that the circuit arrangement usually employed is such that the transducer element is applied with a voltage from an operational amplifier which receives an output therefrom. The voltage applied from the operational amplifier prevents a minimal output from the transducer element from being determined with a sufficient accuracy, thus making it impossible to provide photometry of light having a minimal intensity.

SUMMARY OF THE INVENTION

It is an object of the invention to provide a photometric apparatus which comprises a photoelectric transducer elememt for receiving light reflected from at least one of the surfaces of a film and a shutter blind, and an operational amplifier for biasing the transducer element so as to maintain the voltage applied thereacross substantially null, thereby enabling an effective photometric value to be derived from a critical operation of the transducer element.

In accordance with the invention, the photoelectric transducer element is biased by some means of the operational amplifier, avoiding the application of an unnecessary voltage across the element, so that a critical operation of the transducer element in response to a weak light can be effectively determined as a photometric value.

It is another object of the invention to add to the photometric apparatus a photometry correction circuit which is operated by a switch interlocked with the movement of the first blind of the shutter so as to eliminate a difference in the optical reflectivity between the shutter blind and film surfaces.

It is a further object of the invention to provide a first blind of the shutter which comprises reflecting surfaces of high and low reflectivities, thereby minimizing the influence of the reflective light upon the film.

It is still another object of the invention to provide an ideally compact camera by locating the photoelectric transducer element and a photometry trigger switch on a printed circuit board including a shutter control circuit, and by positioning the printed circuit board below a reflecting mirror which switches between a view finder light path and a photographic light path.

It is an additional object of the invention to provide, in addition to the photoelectric transducer element which receives a reflected light from at least one of the surfaces of a shutter blind and a film, a second photoelectric transducer element which is responsive to a reflective light from a reflecting mirror which switches between a view finder light path and a photographic light path, so as to permit a display of the shutter operation by means of the second transducer element.

DETAILED DESCRIPTION OF THE PREFERRED EMBODIMENTS

Figure 1:
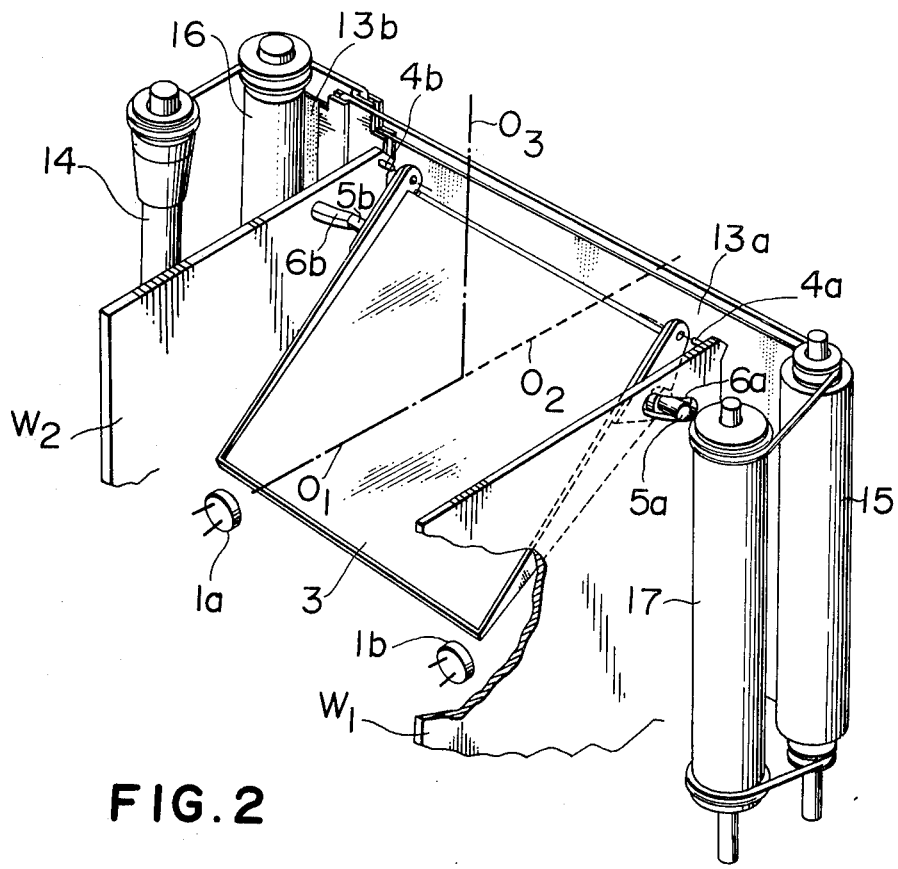
FIG. 1 is a perspective view showing the general arrangement, partially broken away, of a single lens reflex camera in which the photometric apparatus according to the invention is incorporated.
Figure 2:
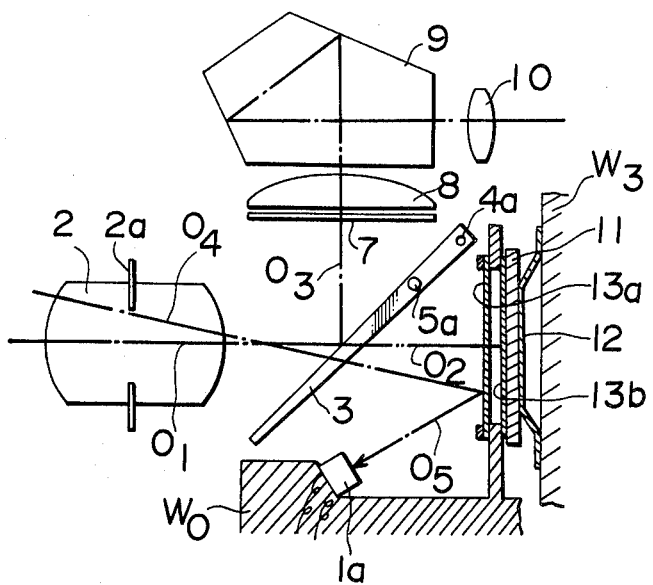
FIG. 2 is an elevational view, partly in section, of part of the single lens reflex camera shown in FIG. 1.

Referring to FIGS. 1 and 2, there is shown a part of a single lens reflex camera in which the photometric apparatus according to the invention is incorporated. Referring to these Figures, a pair of photoelectric transducer elements $1a$ and $1b$ are secured to the bottom plate $W_0$ of a camera body at positions below and on the opposite lateral sides of a reflecting mirror 3 which switches light that is transmitted through a photographic optical system 2 (see FIG. 2) along a light path $O_1$ between a photographic light path $O_2$ and a view finder (hereinafter "finder") light path $O_3$. The reflecting mirror 3 is swingably mounted at pivots $4a$, $4$ sidewalls on a pair of sidwalls $W_1$, $W_2$. The reflecting mirror also carries a pair of studs $5a$ and $5b$ which are fitted in a pair of arcuately elongate slots $6a$ and $6b$ formed in the sidewalls $W_1$ and $W_2$, respectively, so as to constrain the extent of rotation thereof. When the shutter is not released, the reflecting mirror 3 assumes its lower position shown in FIG. 2 in which it is inclined by an angle of 45° with respect to the light path $O_1$ to guide the light from the light path $O_1$ to the finder light path $O_3$.

The finder light path $O_3$ comprises a matt glass 7, a magnifying lens 8, a pentaprism 9 and an eyepiece 10, as shown in FIG. 2, and the image of an object focussed on the matt glass 7 can be observed through the eyepiece 10.

When the shutter is released, the reflecting mirror 3 rotates clockwise, as viewed in FIG. 2, by interlocked movement therewith to connect the light path $O_1$ with the photographic light path $O_2$. A film 11 is disposed on the photographic light path $O_2$ at a position where the image of an object being photographed is focussed, and is maintained in a planar configuration as a result of pressure from a rear plate 12 which is mounted on a rear lid $W_3$.

The first blind $13a$ and the second blind $13b$ of the shutter are disposed immediately in front of the film 11. The first blind $13a$ isolates the film 11 from the photographic light path $O_2$ subsequent to a film winding operation until the shutter is released to move the reflecting mirror 3 upwards. Under this condition, the first blind $13a$ is taken up by a first blind winding drum 14 (see FIG. 1), and as the mirror 3 moves up upon shutter release, the first blind runs across the film 11 by being taken up on a take-up drum 15, thereby allowing the film 11 to be exposed to the photographic light path $O_2$. On the other hand, the second blind $13b$ is normally wound on a second blind winding drum 16, and a second blind take-up drum 17 is constrained by an electromagnet Mg (see FIG. 3) which is energized upon shutter release and deenergized at a time depending on a photometric result, whereupon the electromagnet permits the drum 17 to take up the second blind $13b$, thus causing it to run across the film to isolate it from the photographic light path $O_2$.

Figure 3:
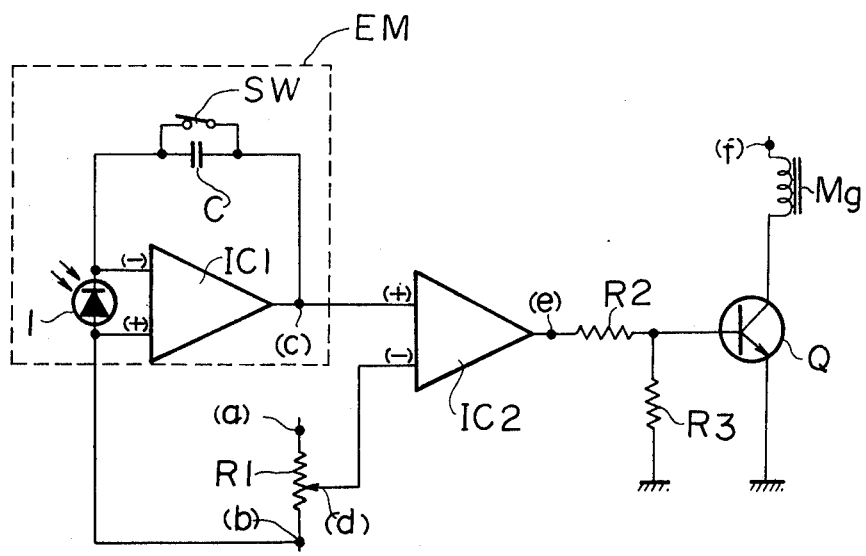
FIG. 3 is a circuit diagram of a shutter control unit including the photometric apparatus according to one embodiment of the invention.
Figure 4:
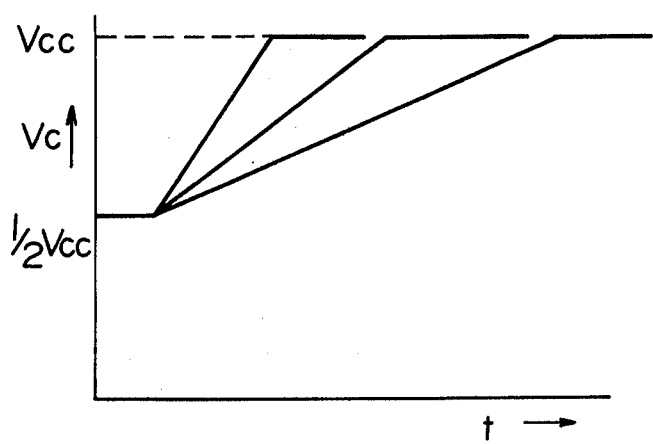
FIG. 4 is a diagram showing the charging of a capacitor which is used in a time constant circuit.

FIG. 3 shows a unit for controlling the electromagnet Mg and includes the photometric apparatus EM according to one embodiment of the invention. It is to be noted that the photoelectric transducer elements $1a$ and $1b$ are designated by a single reference numeral 1 for the purpose of convenience. In practice, these elements are connected parallel, but may be connected in series. These transducer elements comprise a photovoltaic element such as silicon blue cell, and operate to produce a photometric voltage in response to a light path $O_4$ from an object being photographed which is transmitted through the photometric optical system 2 and reflected by the surface of the first blind path $13a$ or film 11 along a path indicated at $O_5$.

Referring to FIG. 3, the transducer element 1 is connected across the non-inverting input terminal (+) and an inverted input terminal (−) of an operational amplifier IC1 having a gain of unity, the terminal (+) being connected with a power source (not shown) through a resistor R1. Denoting the terminal of the resistor R1 which is located nearer the power source by (a) and its opposite terminal by (b), the arrangement is such that a source voltage of Vcc is applied to the terminal (a) while a voltage of ½ Vcc is applied to the terminal (b). The output terminal (c) of the operational amplifier IC1 is connected with the inverted input terminal (−) thereof through a time constant capacitor C which is shunted by a trigger switch SW. The output terminal (c) of the operational amplifier IC1 is also connected with the non-inverting input terminal (+) of a differential amplifier IC2, the inverted input terminal (−) of which is connected with to an adjustable arm at point (d) on the resistor R1. The movable point (d) is adjusted to a suitable position on the resistor R1 so as to apply an optimum voltage to the differential amplifier IC2 depending on the information such as film speed which is necessary to taking a picture. The output terminal (e) of the differential amplifier IC2 is connected with one terminal of a resistor R2, the other terminal of which is connected with the base electrode of transistor Q, the base being connected with to ground potential through resistor R3. The transistor Q has its emitter connected to ground and has its collector connected in series with the electromagnet Mg, and the source voltage Vcc is applied to the opposite terminal (f) of the electromagnet.

In operation, when the shutter is released, the reflecting mirror 3 moves up. Before the first blind $13a$ initiates its movement, the photometry trigger switch SW is closed by interlocked motion with the shutter release, whereby the output voltage of the operational amplifier IC1 or the voltage Vc at the terminal (c) is negatively fed back to its inverted input terminal (−), thus becoming equal to the voltage of ½ Vcc which is applied to the non-inverting input terminal (+). Consequently, the voltage applied to the inverted input terminal (−) of the differential amplifier IC2 will be greater than the output voltage of the operational amplifier IC1 which is applied to the non-inverting input terminal (+) thereof, so that the transistor Q is rendered conductive to energize the electromagnet Mg. The energization of the electromagnet Mg is effective to constrain the second blind take-up drum 17 from rotation, so that the second blind $13b$ can not move.

When the first blind $13a$ initiates its movement upon shutter release, the trigger switch SW is opened by interlocked movement with the running of the first blind 13a, and as a result, the output of the operational amplifier IC1 is now fed back through the capacitor C in a manner such that no voltage is applied across the photoelectric transducer element 1. A current will flow therethrough in proportion to the amount of light incident on the transducer element 1 as reflected initially by the first blind 13a and subsequently by the film 11, thus charging the capacitor C. As the capacitor C charges, the output voltage Vc of the operational amplifier IC1 will rise in a manner proportional to the amount of light incident on the transducer element 1, eventually reaching a value equal to the source voltage Vcc, for example. When this occurs, the voltage applied to the non-inverting terminal (+) of the differential amplifier IC2 will become greater than the voltage applied to the inverted input terminal (−) thereof, so that the output voltage will be reversed, rendering the transistor Q non-conductive to deenergize the electromagnet Mg and thus release the second blind take-up drum 17 for rotation. Thereupon, the second blind runs to isolate the film 11 from the photographic light path $O_2$ after a given period of exposure which is determined by the photometric value.

In the present embodiment, it will be noted that initially a bias voltage of ½ Vcc is initially applied to the non-inverting input terminal (+) while a voltage of the same value is applied to the inverted terminal of the operational amplifier IC1 by the feedback from the output thereof, so that a net voltage applied externally across the transducer element 1 is null or substantially null. This permits the capacitor C to be charged in a linear manner commencing from a voltage of ½ Vcc until a voltage of Vcc is reached, thereby assuring a very precise control of the exposure period even when the output voltage of the photoelectric transducer element 1 is minimal as when a diaphragm 2a (see FIG. 2) of the photographic optical system 2 is set at a small value. On the contrary, if a voltage is applied to the transducer element 1 from the operational amplifier IC1 as in the usual practice, the output of the transducer element 1 will be adversely influenced by the applied voltage, preventing an exact determination of a minimal output. It should be understood that the particular value of the bias voltage need not be restricted to ½ Vcc, but may be freely established as required.

Figure 5:
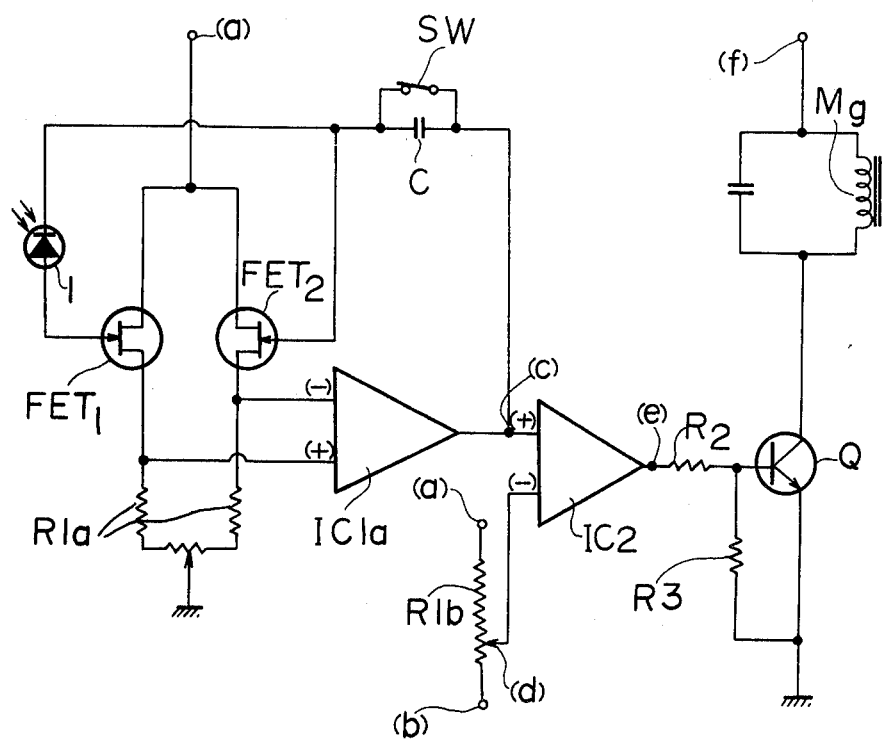
FIG. 5 is a circuit diagram of another shutter control unit including the photometric apparatus according to another embodiment of the invention.

In the above embodiment, it is essential that the operational amplifier IC1 has a relatively high input impedance. This would require a special integrated circuit such as one including a field effect transistor in the circuit of IC1. However, the use of such a special integrated circuit may be avoided by an arrangement shown in FIG. 5 wherein a general purpose operational amplifier IC1a is used in combination with a pair of field effect transistors $FET_1$ and $FET_2$ which are connected in parallel to form an impedance conversion circuit. Specifically, the field effect transistors have their source electrodes connected in common to a power supply while their drain electrodes are connected to ground through resistors R1a. The gate of the transistor $FET_1$ is connected with one terminal of the transducer element 1 while the gate of the transistor $FET_2$ is connected with the other terminal of the transducer element 1. The remainder of the circuit is the same as shown in FIG. 3.

Figure 6:
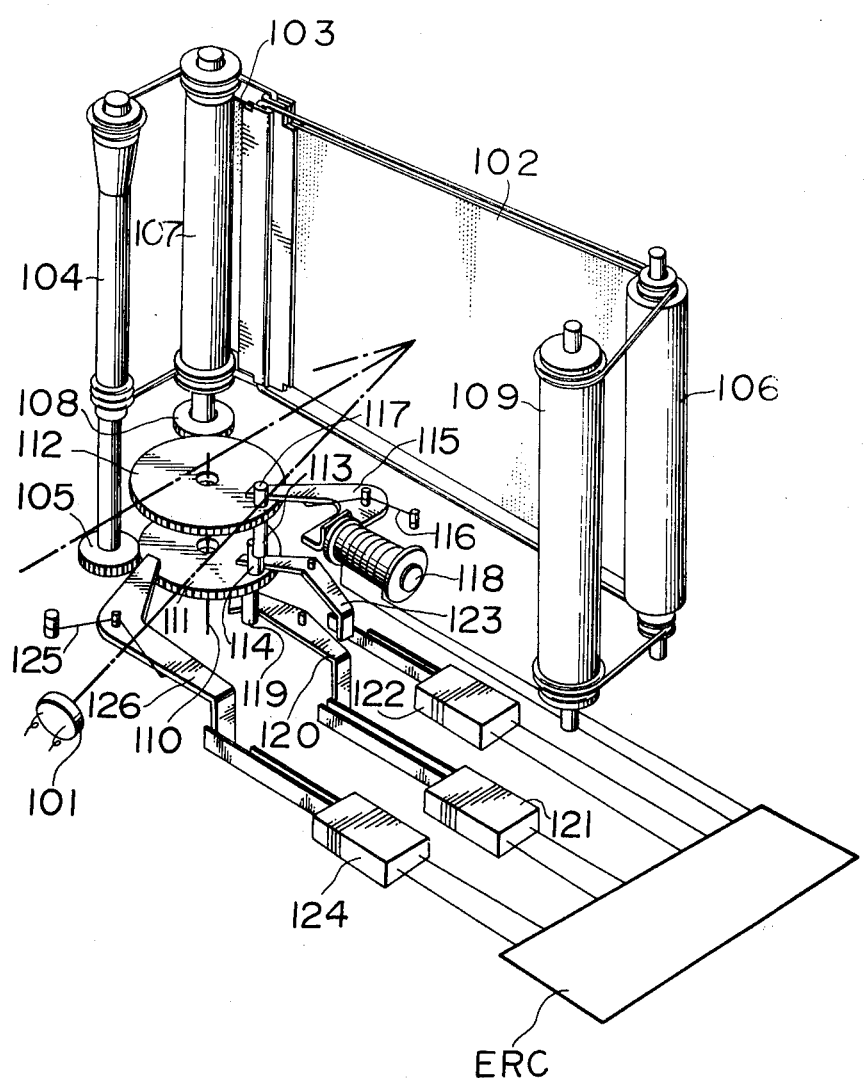
FIG. 6 is a fragmentary perspective view of a single lens reflex camera, illustrating another application of the photometric apparatus according to the invention.

FIG. 6 shows another embodiment of the photometric apparatus according to the invention which assures a proper amount of exposure regardless of differential reflectivities of the surfaces of the shutter blind and a film, by providing a correction circuit for correcting its output when the transducer element receives light reflected by both the surfaces of the shutter blind and a film as the trailing end of the first blind moves across an image field. The correction circuit is operated by a switch which is operated in interlocked relationship with the running of the first blind. In the description to follow, it is assumed that the surface of the shutter blind has a greater reflectivity than the reflectivity of the film surface.

A photoelectric transducer element 101 comprising a photovoltaic element is disposed below the lower extremity of the reflecting mirror so as not to intercept the path of light from an object being photographed, and has its light receiving surface directed toward the focal plane of the photographic optical system. The focal plane shutter includes a first blind 102 and a second blind 103, the latter being located rearwardly of the first blind or nearer the film. A first blind winding drum 104 is integrally provided with a gear 105 and is urged to rotate clockwise by a spring, not shown, which is provided on a first blind take-up drum 106. A second blind winding drum 107 is integrally provided with a gear 108, and is urged to rotate clockwise by a spring which is mounted on a second blind take-up drum 109. The gears 105 and 108 respectively mesh with gears 111 and 112 rotatably mounted on a shaft 110. A projection 113 is fixedly mounted on the underside of the gear 112 which is associated with the second blind, to engage a projection 114 fixedly mounted on the upperside of the gear 11 associated with the first blind, thereby defining a start position. The setting of the engaging position is effected by a rotation of a lever 115 against the resilience of a spring 116 in interlocked relationship with a film winding operation so as to cause its one end to engage a projection 117 fixedly mounted on the upperside of gear 112 and its other end to bear against the attracting surface of an electromagnet 118. The position of the gear 111 is defined by a projection 119, which is fixedly mounted on the underside of this gear, and which engages a pawl portion of a lever 120 which is urged to rotate counter-clockwise. Under this condition, the other end of the lever 120 is located close to a main switch 121 so as to turn it on and to release the gear 111 to permit movement of the first blind 102 in interlocked relationship with the shutter release operation. A lever 123 is located so as to be acted upon by the projection 114 on the gear 111 to turn a photometry trigger switch 122 off during the initial phase of rotation thereof. A lever 126 is urged to rotate counter-clockwise by a spring 125 and has its one end extending into the path of travel of the projection 114 so as to turn a switch 124 off when the gear 111 has undergone nearly one-half revolution. The switches 121, 122 and 124 as well as the elecromagnet 118 are electrically connected to an electronic shutter circuit ERC shown in FIG. 7.

Figure 7:
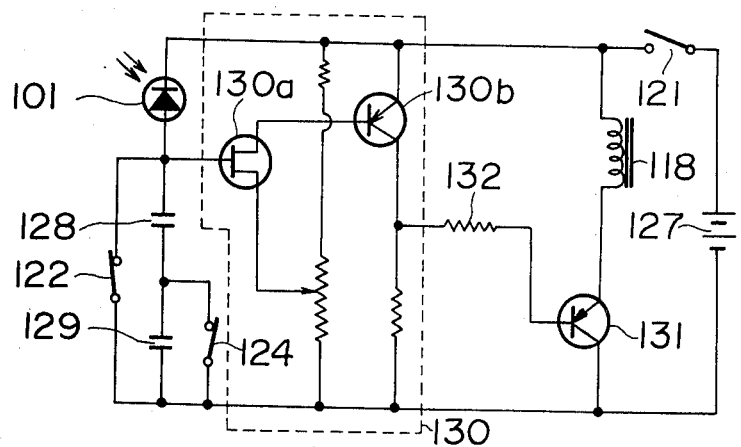
FIG. 7 is a circuit diagram showing a shutter control unit including the photometric apparatus according to a further embodiment of the invention.

Referring to FIG. 7, connected across a battery 127 in series with a normally open main switch 121 are a time constant circuit comprising a photoelectric transducer element 101 and capacitors 128, 129; a switching circuit 130 indicated in a box shown by broken lines and including FET 130a and a transducer 130b; and a circuit including a transistor 131 and a resistor 132 for energizing an electromagnet 118 which is operative to permit the shutter 103 to be closed. The main switch 121 is closed upon shutter release, and a normally closed switch 122 connected across the series connection of capacitors 128 and 129 is opened simultaneously with an opening of the shutter when it is released. It will be seen that the time constant circuit commences its operation from the time the switch 122 is opened. One of the capacitors 129 is shunted by a normally closed switch 124 which is opened when the trailing edge of the first blind 102 of the shutter passes through the approximate central position of an image field. The correction for the output of the photometric circuit is initiated when the switch 124 is opened.

In FIG. 6, the various parts are shown in the positions which they assume subsequent to a film winding operation. Upon shutter release, the lever 120 rotates clockwise against the resilience of the spring to turn on (i.e. close) the main switch 121 and is also disengaged from the projection 119, whereby the first blind 102 initiates its movement under the action of the spring located on the first blind take-up drum 106, causing the gear 111 to rotate counter-clockwise. During the initial phase of the rotation, the projection 114 opens switch 122, thereby enabling the operation of the time constant circuit comprising the photoelectric transducer element 101 and the capacitor 128 so as to measure reflected light. When the gear 111 has rotated through nearly one-half revolution, the projection 114 causes the lever 126 to rotate against the resilience of the spring 125, opening switch 124 to thereby connect the capacitor 129 into the time constant curcuit. Subsequently the gear 111 continues to rotate to bring the projection 114 into engagement with the projection 113 on the gear 112, so that the stop position can be positively defined even if the release is maintained.

Simultaneously with the initiation of movement of the first blind, a current will flow through the transistor 131 to energize the electromagnet 118, maintaining the lever 115 in engagement with the projection 117 on the gear 112 to thereby block the movement of the second screen 103. An exposure of the film is effected under this condition, and when a proper amount of exposure has been achieved on the film, the switching circuit 130 operates to interrupt the current flow through the transistor 131, thereby deenergizing the electromagnet 118. Thereupon, the lever 115 rotates clockwise to be disengaged from the projection 117 under the action of the spring 116, whereby the second blind 103 is driven to run by the take-up drum 109, thus terminating a photographing operation. At this time, the projection 113 on the gear 112 rotates through one revolution and engages with the projection 114 on the gear 111, whereupon its rotation is interrupted.

Figure 8:
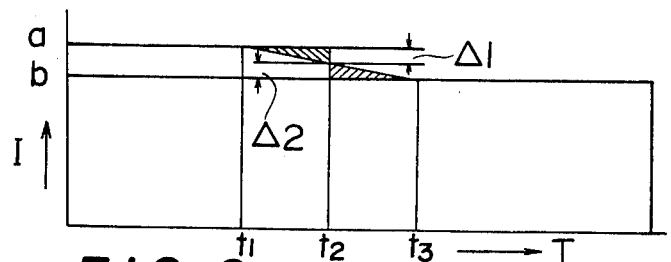
FIG. 8 graphically shows the mode of operation of a photometry correction circuit.

FIG. 8 graphically shows the current I on the ordinate which is obtained by a photometry of light reflected from the surfaces of the shutter blind and the film and plotted over time T which represents the period of movement of the first blind of the focal plane shutter. By the time $t_1$ when the trailing edge of the first blind 102 moves completely into the image field, the film is not exposed so that reflected light which reaches the transducer element 101 represents solely the reflected light from the first blind 102. Thus, the current remains at a constant value $a$. Subsequently as the trailing edge of the first blind 102 moves across the image field, that area of the first blind which is irradiated by the light from an object being photographed will decrease gradually, and when the trailing edge of the first blind 102 assumes approximately a central position in the image field, the current will be reduced by an amount of $\Delta 1$. This is indicated at time $t_2$, at which time the switch 124 is turned off so that the current will continue to decrease by an amount $\Delta 2$ until a constant value $b$ is reached at time $t_3$ when the first blind 102 has moved past the image field. Subsequently, the photocurrent $b$ which is produced by the light reflected from the film is maintained. The ideal change in current will be that in which the current $a$ owing to the reflected light from the first blind is maintained until time $t_2$ and thereafter the current $b$ owing to the reflected light from the film is maintained. The error between such ideal current change and that is obtained in accordance with the invention is minimized as indicated by the following expression representing expressions ratio of areas; ratio by the time $t_2$:

$$\frac{a\{t_1 + (t_2 - t_1)\} - \frac{1}{2}\Delta 1 (t_2 - t_1)}{a\{t_1 + (t_2 - t_1)\}}$$

ratio by the time $t_3$:

$$\frac{a\{t_1 + (t_2 - t_1)\} + b(t_3 - t_2) - \frac{1}{2}\Delta 1(t_2 - t_1) + \frac{1}{2}\Delta 2(t_3 - t_2)}{a\{t_1 + (t_2 - t_1)\} + b(t_3 - t_2)}$$

Reducing the above expressions with typical values, the rate by the time $t_2$ is 1:0.95 while the rate by the time $t_3$ is nearly 1:1. Thus, the error is small enough that the influence on the proper exposure is negligible.

Figure 9:
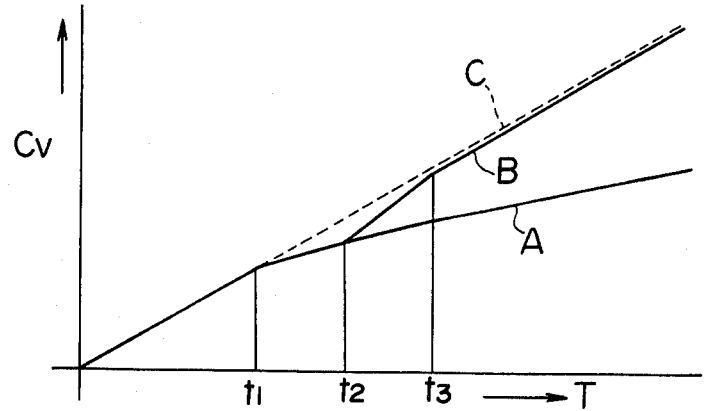
FIG. 9 graphically shows a differential charging of the capacitor with and without photometry correction.

FIG. 9 graphically shows the variation of the photocurrent of FIG. 8 in terms of a change in the amount to which the capacitor is charged, or Cv. If the reflectivity of the shutter blind is different from that of the film surface, the light input to the photometric circuit without correction will follow a curve A. In accordance with the invention, a correction is made in the electrical circuit to maintain the same information. Specifically, the switch 124 is opened at a time $\{t_1 + (t_2 - t_1)\}$ to change or reduce the composite capacitance of the time constant circuit so as to maintain the integrating characteristic constant even though a reduction occurs in the amount of light received. As shown by a curve B, the opening of the switch 124 at a time $t_2$ produces a discontinuity, but the error from an ideal curve indicated by broken line curve C is minimal, closely following it. In this manner, a compensation can be provided for a difference in the reflectivity.

In the above embodiment, the reflectivity of the first blind has been assumed to be greater than that of the film, but where the reflectivity of the film is greater than that of the first blind, switch 124 may be replaced by a normally open switch to achieve the similar result.

Figure 10:
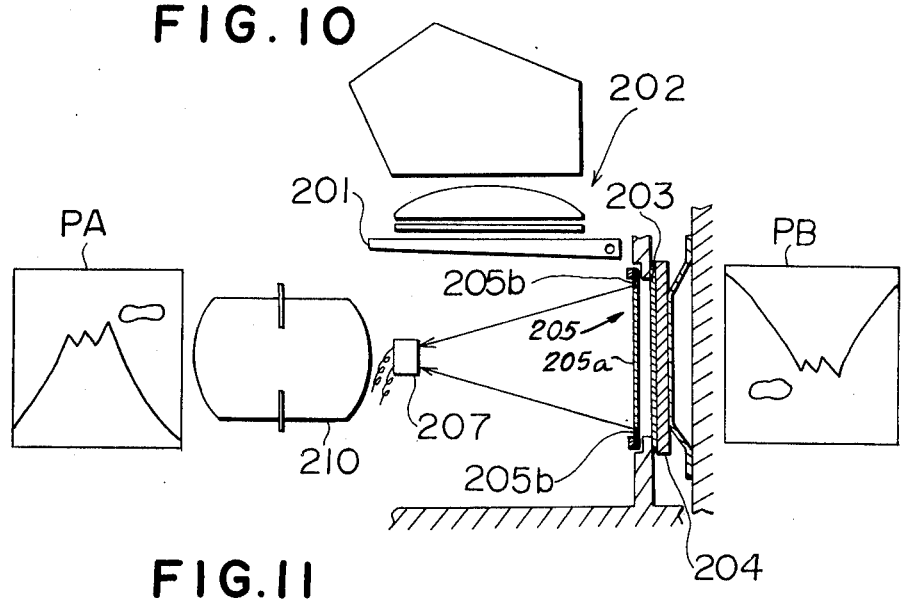
FIG. 10 is a schematic elevation, partly in section, of the single lens reflex camera incorporating the photometric apparatus according to still another embodiment of the invention.
Figure 11:
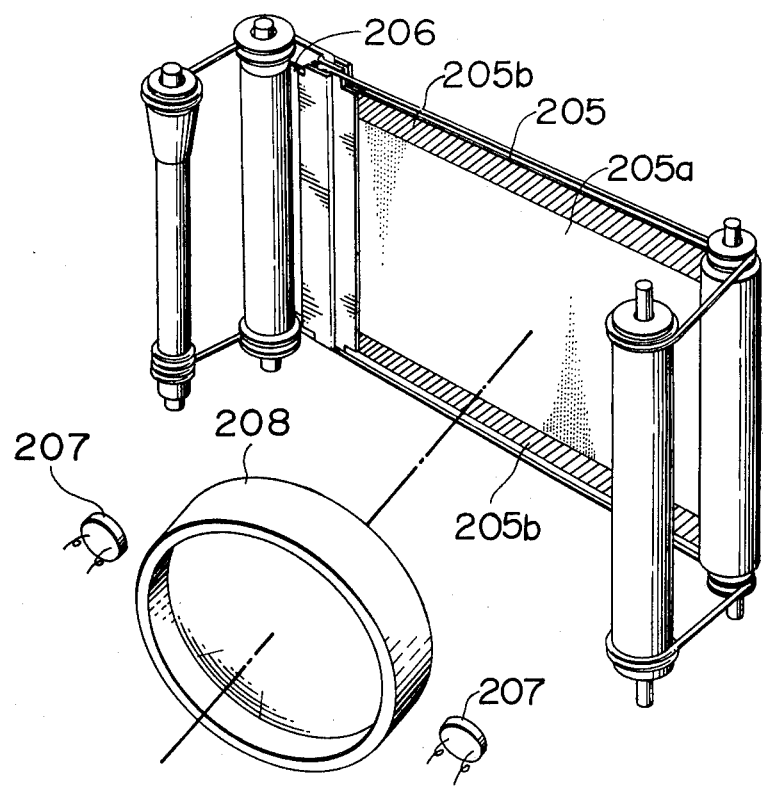
FIG. 11 is a fragmentary perspective view of the single lens reflex camera shown in FIG. 10.

FIG. 10 shows an apparatus according to the invention in which the shutter blind comprises portions of high and low reflectivities. Specifically, a single lens reflex camera 202 having a movable reflecting mirror 201 includes a film 203 in its rear part which is urged against and retained by a pressure plate 204. A first blind 205 and a second blind 206 of the shutter which are adapted to run immediately in front of the film 203 are mounted on the respective blind shafts with known means. The first blind 205 of the shutter comprises a surface 205a and a surface 205b on its side which is irradiated by light from an object being photographed. The surface 205a has a high reflectivity as obtained by a coating of material having a high reflectivity, while the surface portions 205b have a very low reflectivity and are located at the upper and lower marginal edges of the first blind 205 where diffuse light may have adverse influences upon the film 203, the surfaces 205b being formed of a frosted surface, black cloth or the like. As shown in FIG. 11, photoelectric transducer elements 207 are fixedly mounted on the camera body at positions such as on either side of the mount 208 for a photographic optical system 210 where they do not intercept light from an object being photographed and are positioned so as to be capable of receiving light from the object being photographed which is reflected by the high reflectivity portion 205a of the first blind of the shutter or by the surface of the film 203. It will be appreciated that the transducer element 207 has its terminals connected with a shutter timing circuit, not shown, so as to control the timing of the initiation of movement of the second blind 206 in dependence upon the amount of light received. With the above arrangement, the transducer element 207 receives light reflected from the high reflectivity portion 205a of the first blind when the reflected mirror 201 moves up, and then receives light from the film surface 203 subsequent to the movement of the first blind 205, thereby determining an exposure period depending upon the brightness of an object being photographed. The portions 205b having a very small reflectivity prevent diffused light from reaching the film surface 203.

When taking pictures, it often occurs that an object being photographed comprises an upper portion of high luminance and a lower portion of low luminance, as depicted at PA in FIG. 10, or for the light which is transmitted through the photographic optical system 210, the upper portion has a low luminance while the lower portion has a high luminance, as indicated at PB. For an object being photographed of this kind, an exposure period will be normally in the range from 1/60 to 1/125 second, so that the exposure period will be determined only by reflected light from the surface of the first blind 205a of the shutter.

Figure 12:
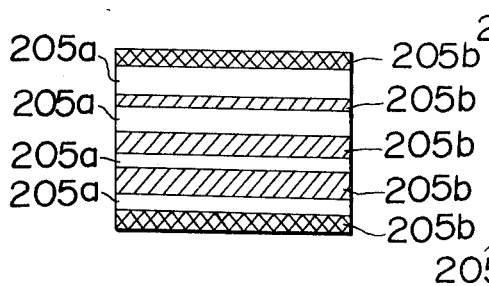
FIGS. 12 to 16 are plan views illustrating examples of the reflecting surface of the first blind of the shutter.
Figure 13:
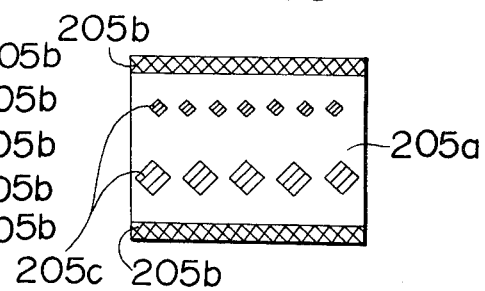
Figure 14:
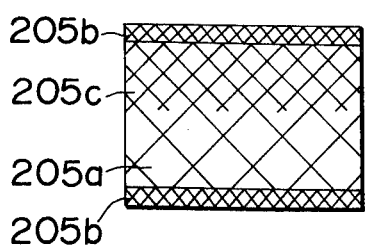
Figure 15:
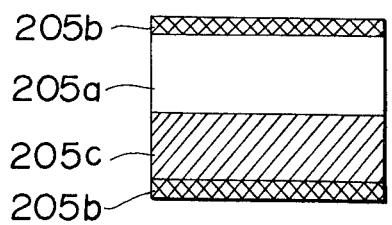
Figure 16:
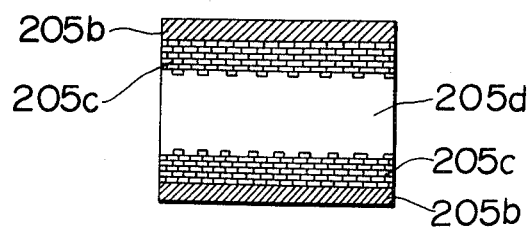

In such an instance, a correction can be made in respect of the amount of light incident onto the light receiving element 207 by using the first blind as shown in FIGS. 12 to 16 which comprises a portion 205a of a high reflectivity and another portion 205c of somewhat reduced, intermediate reflectivity. FIG. 14 shows the reflecting surface of the first blind when a photometry should be principally directed to the lower portion; FIG. 15 shows the reflecting surface of the first blind when the photometry is principally directed to the upper portion; and FIG. 16 shows the reflecting surface of the first blind when the photometry is directed principally to the central portion. It is also possible to use a suitable combination of high reflectivity portions 205a and intermediate reflectivity portions 205b and 205c as indicated in FIGS. 12 and 13, depending upon the purposes of taking pictures. It should be understood that variation in the reflectivity should preferably be continuous although not shown. By using a selected arrangement, adverse influences upon the film can be removed and a correction can be made in accordance with a variable distribution of luminance of an object being photographed.

Figure 17:
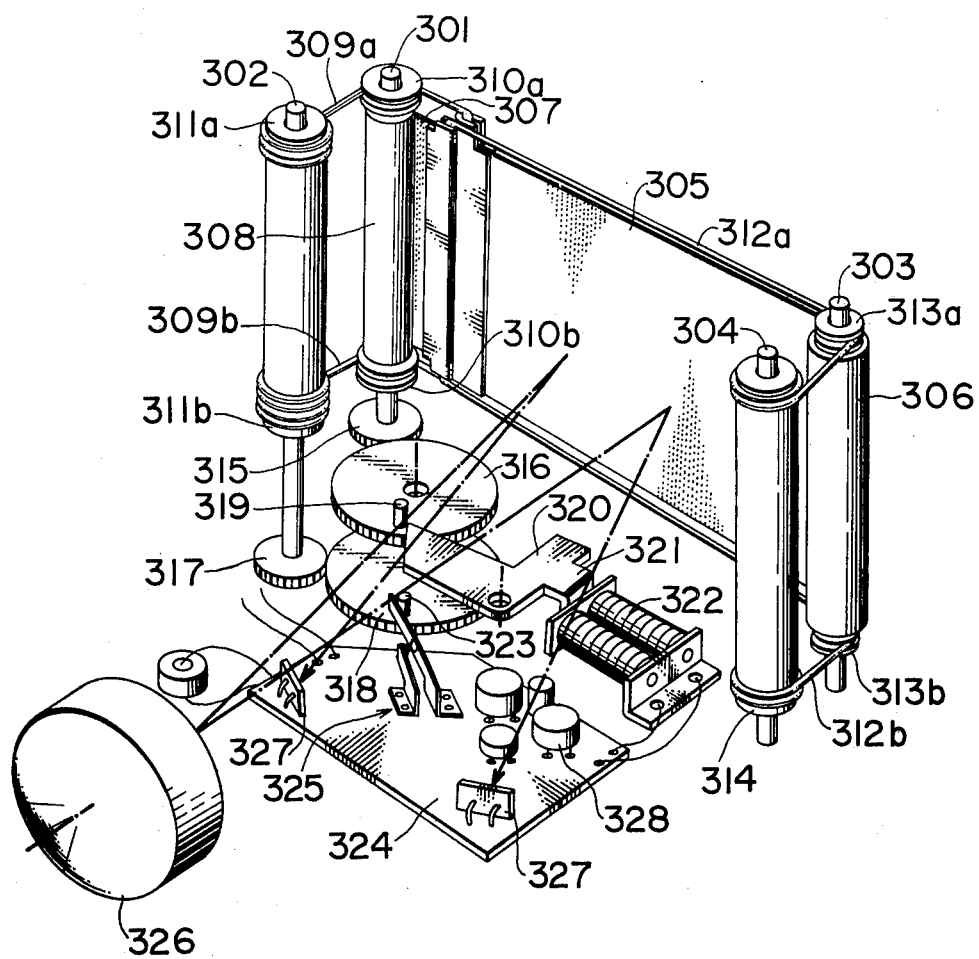
FIG. 17 is a perspective view of a single lens reflex camera incorporating the photometric apparatus according to a still further embodiment of the invention.

FIG. 17 shows an apparatus according to the invention in which certain elements such as a photoelectric transducer element, a photometry trigger switch and the like are disposed on a printed circuit board which is arranged below the reflecting mirror where a free space is relatively available, thus providing a compact structure. Referring to FIG. 17, winding shafts 301 and 302 are vertically mounted on one side of an exposure window while take-up shafts 303 and 304 are vertically mounted on the opposite side, all in a parallel arrangement. A take-up drum 306 is coaxially and integrally fixed on the take-up shaft 303, and the leading portion of a first blind 305 is fixedly attached to the drum. A winding drum 308 is coaxially and integrally fixed on the winding shaft 301, and the trailing portion of a second blind 307 is fixedly attached to the winding drum 308. Ribbon-shaped drawing members 309a and 309b have one of their ends fixed to the upper and lower ends of the first blind 305, and pass around pulleys 310a and 310b, respectively, which are freewheelingly mounted on the winding shaft 301, to be suitably fixed to wheels 311a and 311b which are fixedly mounted on the winding shaft 302. In this manner, the first blind 305 extends across and immediately in front of the film surface. In a similar manner, drawing members 312a and 312b have one of their ends fixed to the upper and lower ends of the second blind 307, and pass around pulleys 313a and 313b freewheelingly mounted on the first blind take-up shaft 303 to have their other ends suitably fixed to a drum 314 which is fixedly mounted on the take-up shaft 304. In this manner, the second blind also extends immediately in front of the film surface. A gear 315 which is fixedly mounted on the bottom end of the second blind winding shaft 301 meshes with a large diameter gear 316 which is disposed below a movable reflecting mirror, not shown, while a gear 317 fixedly mounted on the bottom end of the first blind winding shaft 302 meshes with a large diameter gear 318 which is coaxially disposed with the gear 316. The gears 316 and 318 are rotatably mounted on a common axle, and a projection 319 is fixedly mounted on the upper surface of the gear 316. A detent arm 320 has its one end extending into the path of rotation of the projection 319. The detent arm 320 is rotatably mounted on a stationary member of a camera, and is urged by a spring, not shown, to rotate counterclockwise so as to have an attracting piece 321 which is provided on its other end displaced from electromagnet 322. A projection 323 is fixedly mounted on the upper surface of the gear 318, and extending into the path of rotation of the projection 323 is a movable piece of a trigger switch 325 associated with electronic shutter which is provided on a printed circuit board 324. Also mounted on the printed circuit board 324 are photoelectric transducer elements 327 so as to receive light from an object being photographed which is transmitted through a photographic lens 326 and reflected by the surface of the shutter blind, the reflected light being incident on the transducer elements in a normal direction. In addition, electrical elements such as transistors or the like are suitably located on the printed circuit board, and are designated by reference numeral 328.

In the position shown, the film has been wound and the shutter has been charged. The attracting piece 321 of the detent arm 320 is pushed forward by the electromagnet 322 and is prevented from returning. Under this condition, the transducer 327 initiate the photometry of light from an object being photographed. When a shutter button is depressed to release the shutter, the constraint on the gear 318 is released, whereby a spring (not shown) internally housed within the first blind take-up drum 306 causes the first blind 305 to run. Simultaneously, the gear 318 rotates counter-clockwise, opening trigger switch 325. At the same time with the opening of trigger switch 325, the time constant circuit of the electronic shutter circuit operates, and deenergizes the electromagnet 322 after an exposure period which is commensurate with the brightness of light from an object being photographed. Thus, the detent arm 320 is released, rotating counterclockwise to disengage from the projection 319, whereby the second blind 307 initiates movement to complete a photographing operation.

Figure 18:
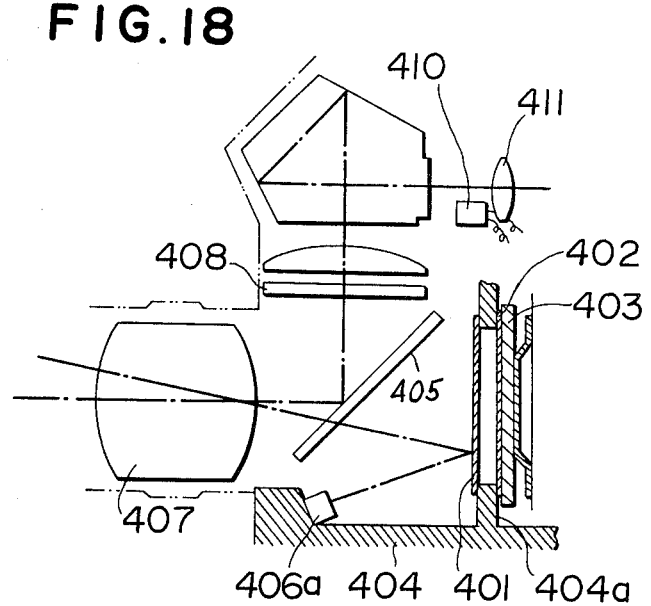
FIG. 18 is a schematic side elevation, partly in section, of the single lens reflex camera shown in FIG. 17.
Figure 19:
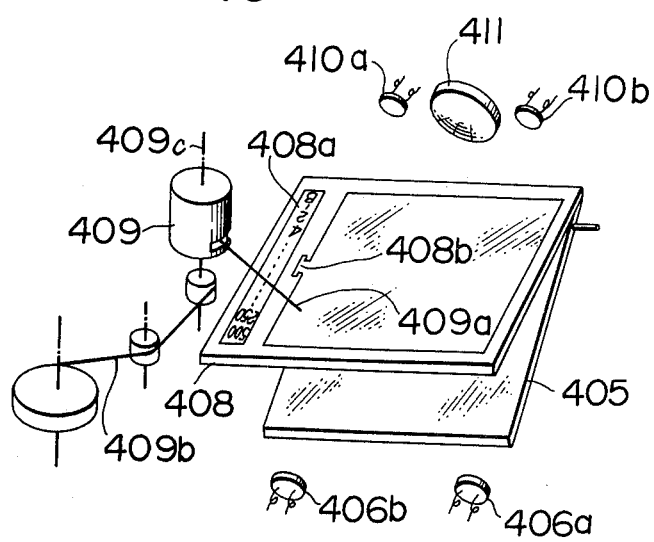
FIG. 19 is a perspective view showing the relative positioning of the light path switching reflecting mirror and the photoelectric transducer element.

FIGS. 18 and 19 show another apparatus of the invention employing a first photoelectric transducer element for receiving light reflected by a shutter blind or film surface, and a second photoelectric transducer element for receiving light reflected by the reflecting mirror. It is to be understood that a first blind 401 and a second blind (not designated) are adapted to run in interlocked relationship with the other camera operations such as the operation of release member. A film 402 is urged by a pressure plate 403 on the rear lid of the camera against a rail surface 404a of a camera body 404. A light path switching reflecting mirror 405 is pivotally mounted on the camera body so as to move upward upon shutter release. First photoelectric transducer elements 406a and 406b which may comprise a photovoltaic element such as solar cell or the like are similar to the photometric elements illustrated in the other embodiments of the invention, and are fixedly mounted on the camera body 404 at positions in which they do not intercept light from an object being photographed which is transmitted through a photographic optical system 407. The transducer elements 406a and 406b have their light receiving surfaces positioned so as to be capable of receiving light reflected by the first blind 401 or the film surface 402 when the reflecting mirror 405 moves upward. In the subsequent description, both elements 406a and 406b will be referred to by a single reference numeral 406. A focussing plate 408 is located at a position which is conjugate with the film surface 402 with respect to the reflecting mirror 405, and along its one side are provided indices 408a for indicating an exposure period and an index 408b for a manual exposure setting. A galvanometer 409 is pivotally mounted on the camera body in a manner such that its pointer 409a can provide an indication on the indices 408a and 408b, and is adapted to be rotated about the axis 409c in interlocked relationship with a diaphragm presetting ring, not shown, through a transmission string 409b. Second photoelectric transducer elements 410a and 410b are secured to the camera body on the opposite sides of an eyepiece 411 so as to be capable of receiving light reflected by the reflecting mirror 405. In the description to follow, the elements 410a, 410b will be designated by a single reference numeral 410.

Figure 20:
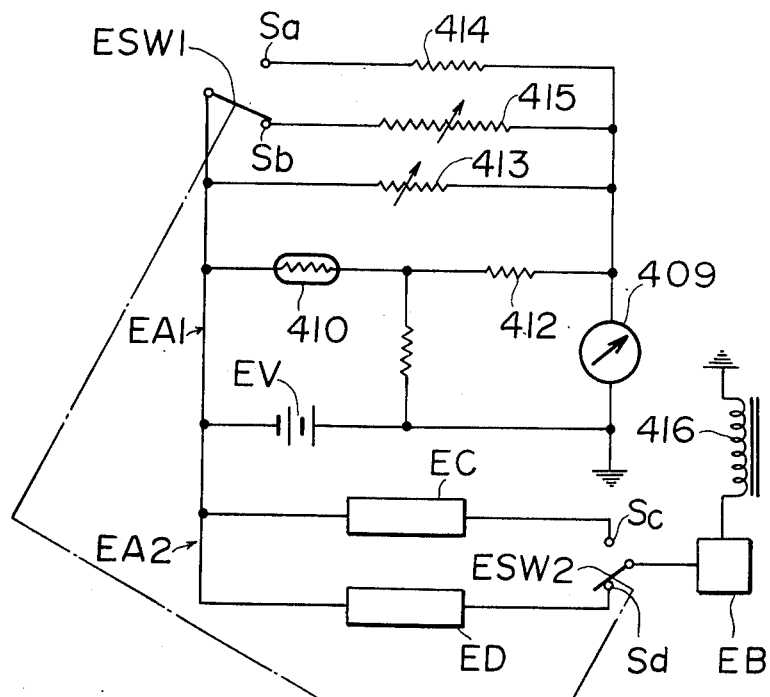
FIG. 20 is a circuit diagram of a display device for displaying the operation of the shutter which may be used in the apparatus of the invention.

A display circuit EA1 for operating the galvanometer 409 is arranged as shown in FIG. 20. Specifically, the transducer element 410 has its one terminal connected with the negative pole of a power supply EV, and its opposite side connected with a positive pole of the power supply through a resistor 412 and the galvanometer 409 in series. A variable resistor 413 for presetting a film speed is connected across the power supply in shunt with the transducer element 410. A fixed resistor 414 for automatic exposure and a variable resistor 415 for manual exposure which is in interlocked relationship with a shutter ring, not shown, are connected with contacts Sa, Sb of a changeover switch ESW1 so as to be selectively connected across the power supply EV in shunt with the transducer element 410.

On the other hand, a timing circuit EA2 for controlling the movement of the second blind of the shutter is arranged as follows: An electromagnet 416 which constrains the second blind from running has its one terminal grounded at the body and its other terminal connected with a switching circuit EB so as to be turned on and off by the latter. An automatic exposure circuit EC and a manual exposure circuit ED each have one terminal connected with the negative pole of the power supply EV and their remaining terminal connected with contacts Sc, Sc of a change-over switch ESW2 which is interlocked with the change-over switch ESW1 so as to be selectively connected with the switching circuit EB.

Figure 21:
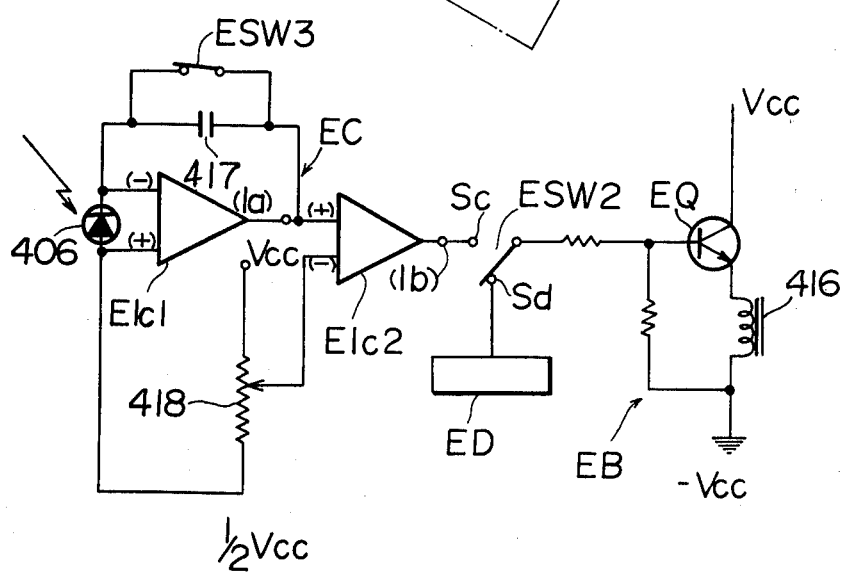
FIG. 21 is a circuit diagram of a shutter control unit incorporating the photometric apparatus according to an additional embodiment of the invention.

The automatic exposure circuit EC has an arrangement as shown in FIG. 21. Specifically the first transducer element 406 is connected across the (−) terminal and (+) terminal of a first operational amplifier EIC1, the output terminal (1a) of which is connected with the (−) terminal thereof through a parallel connection of a trigger switch ESW3 and a time constant capacitor 417 to form a photometric circuit, the trigger switch being opened in interlocked relationship with the running of the first blind of the shutter. A second operational amplifier EIC2 has its (+) terminal connected with the output terminal (1a) of the first operational amplifier, while its output terminal (1b) is connected with the contact Sc of the change-over switch ESW2. A variable resistor 418 for introducing information such as film speed or the like is adapted to be moved together with the variable resistor 413 in the display circuit EA1.

With the above arrangement, when an automatic exposure is used to take a picture, the change-over switches ESW1 and ESW2 are thrown to the automatic exposure side, namely to the contacts Sa and Sc. When the camera is directed to an object being photographed, the second transducer element 410 receives light from an object being photographed as reflected by the reflecting mirror 405, thereby deflecting the pointer 409a of the galvanometer depending upon the brightness of the object being photographed. It will be understood that the deflection varies with the setting of the resistor 413 and a rotation of the galvanometer 409 which occurs as a result of rotation of a diaphragm presetting ring. Thus, by suitably presetting the relative position of the pointer 409a of a galvanometer and the indices 408a for indicating an exposure period, an exposure period can be informed to the user previously. Upon depression of a shutter button, diaphragm blades are moved to define a preset diaphragm value and the reflecting mirror 405 moves up, whereby light from an object being photographed reaches the surface of the shutter blind 401. Thus the first transducer element 406 receives reflected light from the surface of the shutter blind 401 under the preset diaphragm. Before the first blind runs, a trigger switch ESW1 is closed, so that the voltage at the output terminal (1a) of the operational amplifier EIC1 will be equal to one-half the supply voltage Vcc. The operational amplifier EIC2 operates as a comparator, and since the output voltage V1a of the photometric circuit is less than the voltage applied to (−) terminal of the operational amplifier EIC2 which is obtained by a voltage division of the supply voltage Vcc and ½ Vcc, the output voltage of this amplifier will be a positive voltage, whereby transistor EQ conducts to energize the electromagnet 416, which therefore constrains the second blind from running. Then the first blind 401 runs, and as the trigger switch ESW3 is opened, the time constant capacitor 417 will be charged with a constant current which is supplied by a short-circuit current of the transducer element 406 which varies linearly with the luminance of the light being received to thereby produce a linear variation in the output voltage V1a of the photometric circuit, in view of the fact that feedback is made through the time constant capacitor 417 so as not to apply voltage across the first transducer element 406.

This variation depends on the amount of light which is transmitted through the photographic lens and reflected by the shutter blind or film surface. When the amount of such light is high, the output voltage V1a of the photometric circuit will rise very rapidly. As the output voltage V1a of the photometric circuit gradually increases and becomes greater than the voltage applied to (−) terminal of the operational amplifier EIC2, the output voltage of the operational amplifier EIC2 will instantaneously change from a positive voltage to zero volt, thereby rendering the transistor EQ non-conductive to deenergize the electromagnet 416, which therefore release the second blind for running to terminate a photographing operation.

In a manual exposure operation, the change-over switches ESW1 and ESW2 are thrown to the contacts Sb and Sd, respectively. A proper exposure can be achieved by rotating the galvanometer 409 by means of the diaphragm presetting ring or by the operation of the variable resistor 415 which is interlocked with the shutter ring so as to make the pointer 409a of the galvanometer coincident with the manual exposure index 408b. Subsequently, the depression of a shutter button initiates a shutter operation, and the adjustment of the timing at which the running of the second blind is initiated is made by making a variable resistor in the manual exposure circuit, not shown, interlocked with the variable resistor 415 to control the turning off of the electromagnet 416. Such circuit is known and therefore will not be described in detail.

It will be seen that in an automatic exposure operation, the first transducer element 406 controls an exposure period while the second transducer element 410 allows such exposure period to be displayed, and that in a manual exposure operation, the exposure can be controlled by means of the second photoelectric transducer element 410.

It should be noted that the photoelectric transducer element used in the present invention may comprise elements other than a photovoltaic element by suitable design of the circuit.

What is claimed is:

1. In a photographic camera of the type which includes an objective lens, a first shutter blind for initiating exposure of a light-sensitive film and having a light reflecting surface facing said objective lens, and a second shutter blind for terminating said exposure, an electronic timing circuit comprising:
   a photoelectric transducer element mounted in said camera at a location which permits said transducer element to receive light reflected from said first shutter blind light reflecting surface and/or said film;
   a capacitive network;
   first means cooperating with said transducer element for causing a charging current to flow though said capacitive network in response to the initiation of a shutter release operation, said charging current being a function of the amount of light received by said transducer element whereby the charge across said capacitive network changes as a function of both said charging current and the effective time constant of said capacitive network;
   said capacitive network including second means responsive to movement of said first shutter blind across said film for modifying the effective time constant of said capacitive network an amount sufficient to compensate for changes in the magnitude of said charging current resulting from differences in the coefficients of reflectivity of said first shutter blind reflective surface and said film.

2. The electronic timing circuit of claim 1 wherein said capacitive network includes first and second capacitors and wherein:
   said first means causes at least a portion of said charging current to flow through said first capacitor in response to the initiation of said shutter release operation; and
   said second means causes at least a portion of said charging current to flow through said second capacitor in response to movement of said first shutter blind across said film, said first and second capacitors being connected in such a manner that the effective time constant of said capacitive network is at a first value before said second means causes at least a portion of said charging current to flow through said second capacitor and a second value after said second means causes at least a portion of said charging current to flow through said second capacitor.

3. The electronic timing circuit of claim 2 wherein said second means causes at least a portion of said charging current to flow through said second capacitor when the trailing edge of said first shutter blind passes through the center of the image field of said film being exposed.

4. The electronic timing circuit of claim 2 wherein said first and second capacitors are connected in series and wherein said seond means comprises a by-pass switch connected in parallel with said second capacitor.

5. The electronic timing circuit of claim 4 wherein said second means further includes means for opening said by-pass switch when the trailing edge of said first shutter blind passes through the center of the image field of said film being exposed.

6. A photographic camera comprising:
   a housing;
   an objective lens mounted on said housing;
   a first shutter blind for initiating exposure of a light sensitive film and having a light reflective surface facing said objective lens;
   a second shutter blind for terminating said exposure;
   a photoelectric transducer element mounted in said camera at a location which permits said transducer element to receive light reflected from said first shutter blind light reflecting surface and/or said film;
   a capacitive network;
   first means cooperating with said transducer element for causing a charging current to flow through said capacitive network in response to the initiation of a shutter release operation whereby the charge across said capacitive network changes as a function of both said charging current and the effective time constant of said capacitive network;
   said capacitive network including second means responsive to movement of said first shutter blind across said film for modifying the effective time constant of said capacitive network an amount sufficient to compensate for changes in the magnitude of said charging current resulting from differences in the coefficients of reflectivity of said first blind reflective surface and said film;

third means for causing said second shutter blind to terminate said exposure when the charge across said capacitive network reaches a predetermined value.

7. The photographic camera of claim 6 wherein said capacitive network includes first and second capacitors and wherein:

said first means causes at least a portion of said charging current to flow through said first capacitor in response to the initiation of a shutter release operation; and said second means causes at least a portion of said charging current to flow through said second capacitor in response to movement of said first shutter blind across said film, said first and second capacitors being connected in such a manner that the effective time constant of said capacitive network is at a first value before said second means causes at least a portion of said charging current to flow through said second capacitor and a second value after said second means causes at least a portion of said charging current to flow through said second capacitor.

8. The photographic camera of claim 7 wherein said second means causes at least a portion of said charging current to flow through said second capacitor when the trailing edge of said first shutter blind passes through the center of the image field of aid film being exposed. said 9. The photographic camera of claim 8 wherein said first and second capacitors are connected in series and wherein said second means comprises a by-pass switch connected in parallel with said second capacitor.

10. The photographic camera of claim 9 wherein said second means further includes means for opening said by-pass switch when the trailing edge of said first shutter blind passes through the center of the image field of said film being exposed.

* * * * *